United States Patent [19]

Dechene

[11] Patent Number: 4,552,571
[45] Date of Patent: Nov. 12, 1985

[54] OXYGEN GENERATOR WITH TWO COMPRESSOR STAGES

[75] Inventor: Fernand J. Dechene, New Britain, Conn.

[73] Assignee: VBM Corporation, Louisville, Ky.

[21] Appl. No.: 596,892

[22] Filed: Apr. 5, 1984

[51] Int. Cl.$^4$ .............................................. B01D 53/04
[52] U.S. Cl. .......................................... 55/21; 55/25; 55/68; 55/75; 55/163; 55/179; 55/389
[58] Field of Search ...................................... 55/23–26, 55/31, 33, 35, 58, 59, 62, 68, 74, 75, 161–163, 179, 180, 316, 387, 389

[56] References Cited

U.S. PATENT DOCUMENTS

| 1,798,733 | 3/1931 | Hasche | 55/179 X |
| 1,831,644 | 11/1931 | Adair et al. | 55/31 X |
| 2,944,627 | 7/1960 | Skarstrom | 55/58 X |
| 3,085,379 | 4/1963 | Kiyonaga et al. | 55/23 |
| 3,138,439 | 6/1964 | Skarstrom | 55/33 |
| 3,142,547 | 7/1964 | Marsh et al. | 55/26 |
| 3,176,444 | 4/1965 | Kiyonaga | 55/26 |
| 3,225,518 | 12/1965 | Skarstrom | 55/33 |
| 3,237,377 | 3/1966 | Skarstrom | 55/25 |
| 3,242,650 | 3/1966 | Crawford | 55/163 |
| 3,252,268 | 5/1966 | Stark | 55/25 |
| 3,313,091 | 4/1967 | Berlin | 55/58 |
| 3,338,030 | 8/1967 | Feldbauer, Jr. | 55/25 |
| 3,533,221 | 10/1970 | Tamura | 55/33 |
| 3,710,547 | 1/1973 | Nelson | 55/58 |
| 3,719,025 | 3/1973 | Heinze et al. | 55/31 |
| 3,738,087 | 6/1973 | McCombs | 55/58 |
| 3,788,036 | 1/1974 | Lee et al. | 55/25 |
| 3,880,616 | 4/1975 | Myers et al. | 55/62 |
| 3,891,411 | 6/1975 | Meyer | 55/26 |
| 3,923,477 | 12/1975 | Armond | 55/25 |
| 3,957,463 | 5/1976 | Drissel et al. | 55/25 |
| 3,977,845 | 8/1976 | Walter | 55/25 |
| 4,013,429 | 3/1977 | Sircar et al. | 55/33 |
| 4,021,210 | 5/1977 | Streich et al. | 55/26 |
| 4,126,000 | 11/1978 | Funk | 55/68 X |
| 4,168,149 | 9/1979 | Armond et al. | 55/21 |
| 4,222,750 | 9/1980 | Gauthier et al. | 55/58 |
| 4,265,088 | 5/1981 | Funk | 55/68 X |
| 4,280,824 | 7/1981 | Lassmann et al. | 55/26 |
| 4,348,213 | 9/1982 | Armond | 55/25 |
| 4,349,357 | 9/1982 | Russell | 55/179 X |
| 4,378,982 | 4/1983 | McCombs | 55/179 X |

FOREIGN PATENT DOCUMENTS 3214771 10/1983 Fed. Rep. of Germany .......... 55/25

Primary Examiner—Robert Spitzer
Attorney, Agent, or Firm—Fay, Sharpe, Fagan, Minnich & McKee

[57] ABSTRACT

A first compressor (10) supplies atmospheric air or other gaseous mixtures to a crossover valve (20) at a first relatively low pressure, e.g., 15–18 psi. The crossover valve alternately supplies the atmospheric air to a first molecular sieve bed (22) and a second molecular sieve bed (24) while simultaneously permitting the other molecular sieve bed to discharge adsorbed gaseous components of atmospheric air through a waste gas discharge port (26). A second compressor (40) draws the oxygen which passes through the molecular sieve beds without being adsorbed through a restrictor (60) and a needle valve (62). The restrictor and needle valve are selected and adjusted such that an oxygen pressure of about 2–6 psi is maintained upstream of at least the needle valve. The second compressor increases the pressure of the oxygen to at least 45 psi and pumps it into a storage tank (46) from which it may be supplied to welding or other industrial equipment.

20 Claims, 2 Drawing Figures

OXYGEN GENERATOR WITH TWO COMPRESSOR STAGES

BACKGROUND OF THE INVENTION

The present invention pertains to the art of molecular separation, specifically the physical separation or fractionating of molecular components of a gaseous mixtures. The invention finds particular application in the separation of oxygen from the other components of atmospheric air to supply oxygen to welding equipment and will be described with particular reference thereto. It is to be appreciated, however, that the present invention is also applicable to the separation of other gaseous mixtures and is particularly applicable to applications in which the segregated gases are to be supplied at relatively high pressures.

Heretofore, components have been separated or fractionated from gaseous mixtures utilizing a method and apparatus generally as described in U.S. Pat. No. 2,944,627, issued July 12, 1960 to Charles W. Skarstrom. The Skarstrom system pressurized the gaseous mixture to be fractionated with a compressor or the like. A crossover valving assembly channelled the pressurized gaseous mixture alternately to first and second vessels containing a molecular separation material. The crossover valving assembly further connected the vessel which was not receiving the gaseous mixture with a waste gas or secondary product discharge port. The molecular separation material selectively adsorbed one or more components of the gas and passed one or more other components connoted as a primary product gas. The primary product gas which passed through the vessel was channelled in part to a primary product outlet and in part to the other vessel. The primary product gas portion channelled to the other vessel flushed the adsorbed or secondary product gases therefrom out the secondary product discharge port. Cyclically, the crossover valving assembly switched the connection of the vessels with the incoming gaseous mixture and the secondary product discharge port. This cyclic switching of the vessels provided a continuing, though cyclically surging, flow of the primary product gas. Because the flow rate of the primary product gas varied at different portions of the cyclic switching cycle, a surge tank was commonly connected with the outlet so that a relatively even product flow would be provided by the apparatus.

For welding and other industrial operations, oxygen is supplied at 45 psi or better. In order to maintain a 45 psi pressure in the surge tank and compensate for a pressure drop across the vessels, the input compressor was required to supply the gaseous mixture to the vessels at about 65 psi. To produce oxygen at an average rate of 10 cubic feet per hour required about a one horsepower compressor. Higher oxygen supply rates required correspondingly higher horsepower compressors.

One of the drawbacks of the prior art oxygen generators for supplying oxygen to welding equipment was the relatively large amount of electrical or other energy consumed by the compressor. Another drawback was that the amount and pressure of output oxygen varied or surged during the production system as the vessels were switched. Yet another drawback was that the compressor was required to supply gas at about 65 psi to maintain about 45 psi in the surge tank.

The present invention contemplates a new and improved gas fractioning apparatus and method which provides primary product more efficiently, at a higher pressure, and with less energy consumption.

SUMMARY OF THE INVENTION

In accordance with the present invention, there is provided an apparatus for fractioning components of a gaseous mixture. A first or input compressor means provides a supply of the mixture to be fractionated at a first relatively low pressure, e.g., 15–18 psi. A valving means alternately channels the gaseous mixture from the first compressor means to an input end of at least first and second beds. The beds each contain a physical separation medium which adsorbs at least one adsorbable component of the mixture and passes at least one substantially nonadsorbable component or primary product gas. The beds are connected at an output end thereof with a second or booster compressor means which boosts the pressure of the primary product gas from a second relatively low pressure, e.g., 2–6 psi, adjacent its inlet to a relatively high pressure, e.g., 65 psi.

In accordance with another aspect of the present invention, there is provided a method of fractioning components of a gaseous mixture. The gaseous mixture is supplied at a first relatively low pressure alternately to at least two beds containing a physical separation medium which adsorbs at least one adsorbable component and passes at least one substantially nonadsorbable component or primary product gas. The pressure of the primary product gas downstream from the beds is maintained at a second relatively low pressure, e.g., 2–6 psi, and boosted to a relatively high pressure, e.g., 65 psi, at a primary product gas outlet.

One advantage of the present invention is that it produces the primary product gas more efficiently. Particularly, the back pressure at the primary product outlet end of the beds is maintained relatively low and relatively constant. This produces a relatively flat output flow rate of the primary product gas from the beds which, in turn, produces more useable product.

Another advantage of the present invention is that it provides a substantial power savings. The total horsepower consumed by the two compressors is about half the horsepower required by the input compressors of the prior art. For example, a one-third horsepower input compressor and a one-fifth horsepower booster compressor have been found to produce about $8\frac{1}{2}$ cubic feet per hour. As is to be appreciated, this is about half the one horsepower required in the above-described prior art apparatus to produce ten cubic feet per hour of comparably pure oxygen.

Another advantage of the present invention is that it enables larger amounts of oxygen to be stored. The present invention enables oxygen to be stored at 65 psi or even 100 psi or more. Under these higher pressures substantially more oxygen can be stored in the same size storage tank than at the 45 psi as commonly stored prior art units.

Still further advantages of the present invention will become apparent upon reading and understanding the following detailed description of the preferred embodiment.

BRIEF DESCRIPTION OF THE DRAWINGS

The invention may take form in various steps and arrangements of steps and in various parts and arrangements of parts. The drawings are only for purposes of illustrating a preferred embodiment to the invention and are not to be construed as limiting it.

DETAILED DESCRIPTION OF THE PREFERRED EMBODIMENT

Figure 1:
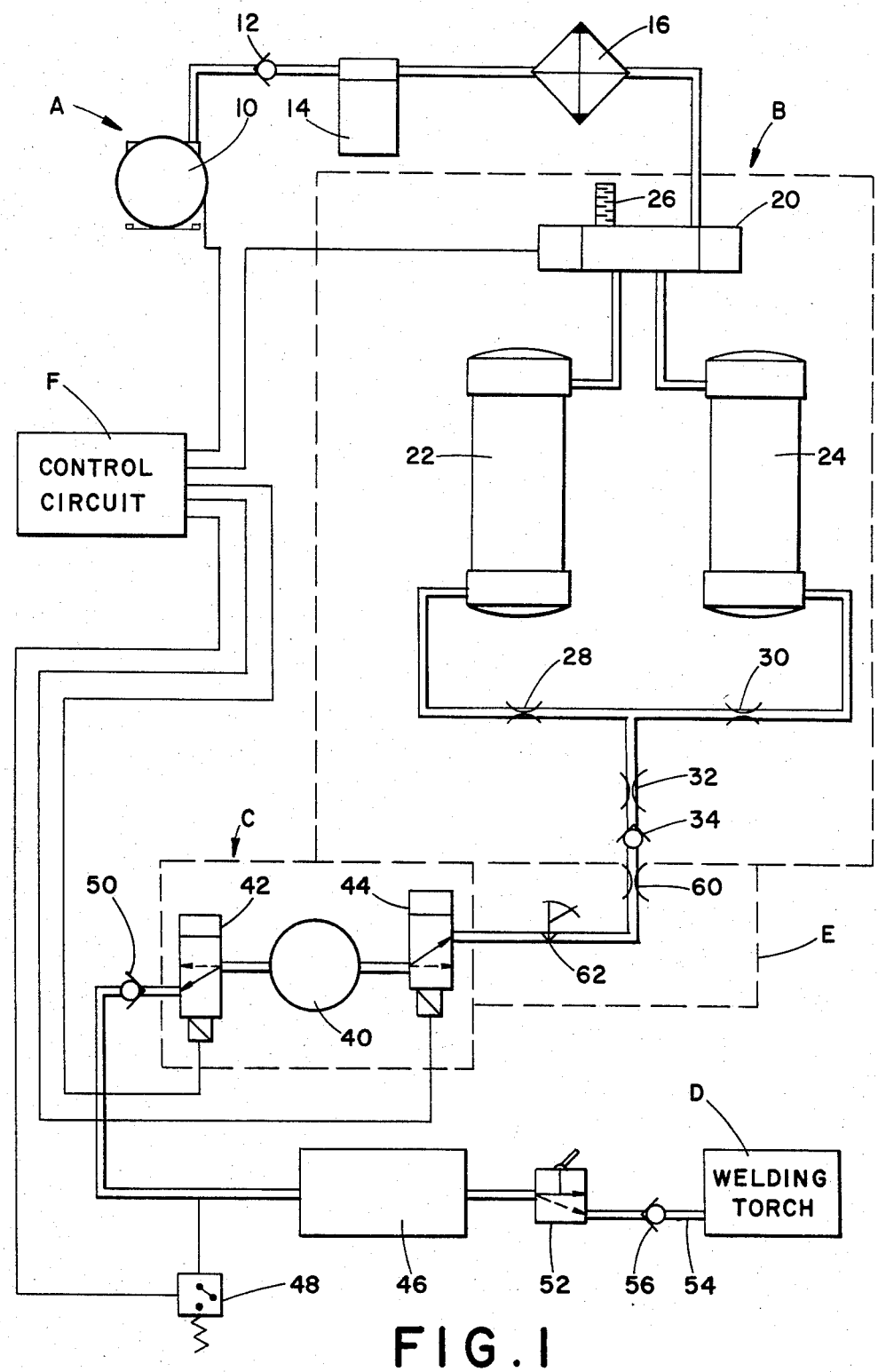
FIG. 1 is a block diagram of an apparatus in accordance with the present invention for separating a primary product gas from a gaseous mixture; and, FIG. 2 is a diagrammatic illustration of an electrical control circuit for the apparatus of FIG. 1.

With reference to FIG. 1, a first or input compressor means A supplies a gaseous mixture, such as atmospheric air, at a first relatively low pressure, to a molecular sieve bed assembly B. The molecular sieve bed assembly separates a primary product gas, such as oxygen, from the gaseous maixture. A second or boster compressor means C draws the primary product gas from the molecular sieve bed assembly B and boosts its pressure to a relatively high pressure. The relatively high pressure primary product gas is supplied to a primary product outlet which is adapted to be interconnected with welding equipment D or the like. A flow and pressure regulating means E regulates the flow rate and pressure of the primary product gas between the molecular sieve bed assembly and the booster compressor means to maintain optimum primary product production conditions. By adjusting the pressure and flow rates, the production rate and the purity of the primary product are selectively adjustable. A control circuit F controls the operation and cycling of the first compressor means, the molecular sieve bed assembly, the second compressor means, and other components.

The first compressor means A includes a compressor, such as a carbon vane compressor, 10 which compresses atmospheric air or another received gaseous mixture to a first relatively low pressure, in the preferred embodiment, about 15-18 psi. However, other pressures below 45 psi are also contemplated. A check valve 12 assures a unidirectional gaseous mixture flow from the first compressor 10 to a filter 14. The filter removes contaminants such as carbon dust, oil vapors, and the like from the gaseous mixture. A heat exchanger 16 conserves energy by cooling the gaseous mixture with a waste or secondary product gas as it expands into the atmosphere.

The molecular sieve bed assembly B includes a crossover valving means 20 which alternately directs the pressurized gaseous mixture to a first bed 22 and a second bed 24, while connecting the bed which is not receiving the gaseous mixture to a waste gas outlet port 26. In the preferred embodiment, the beds are filled with a physical separation medium or material which selectively adsorbs one or more adsorbable components or secondary product gases and passes one or more nonadsorbable components or primary product gases of the gaseous mixture. The physical separation material is a molecular sieve with pores of uniform size and essentially the same molecular dimensions. These pores selectively adsorb molecules in accordance with molecular shape, polarity, degree of saturation, and the like. In the preferred embodiment, the physical separation material is a zeolite which has pores of the appropriate dimension to adsorb nitrogen, carbon monoxide, carbon dioxide, water vapor, and other significant component of air, but not oxygen which is passed as the primary product gas rather than being adsorbed. Type 5A and type 13X zeolite have been found satisfactory.

The crossover valving means 20 under the control of the control circuit F alternates cyclically between a first position and a second position. In the first position, the gaseous mixture is channelled into the first bed first end. Primary product gas is discharged from the first bed second end through a first restrictor means 28. A portion of the primary product gas is channelled through a second restrictor means 30 into the second bed second end. The adsorbed secondary product gases are flushed from the second bed first end, through the crossover valve 20, and out the waste gas outlet port 26. Another portion of the primary product gas is channelled through a third restrictor means 32.

In the second crossover valve position, the gaseous mixture is channelled to the second bed first end. Primary product gas is discharged from the second bed second end through the second restrictor means 30. A portion of the primary product gas is channelled through the first restrictor means 28 to flush the adsorbed second product gases from the first bed. Another portion of the primary product gas is discharged through the third restrictor means 32.

The third restrictor means 32 is connected with the primary product output of the molecular sieve bed assembly B. The restrictiveness of the third restrictor means 32 relative to the first and second restrictor means 28, 30 determines the relative portion of the primary product gas which is returned to flush the bed being regenerated. A check valve 34 assures that the primary product gas is only discharged from the molecular sieve bed assembly B and that atmospheric air or other gases are not drawn in.

The pressure booster means C includes a second compressor means 40 such as a diaphragm type compressor. It is contemplated, that other types of compressors which are suitable for pumping and compressing about 95 percent pure oxygen gas may also be utilized. Compressor start up valving means 42, 44 enable the second compressor means 40 to be started free of load. After the second compressor means is started, the start up valving means are actuated to the position shown in FIG. 1 such that a primary product gas is drawn from the molecular sieve bed assembly B and supplied to a storage tank 46 at a relatively high pressure, 45 psi or more with 65 psi or more being preferred. However, it is contemplated that primary product gas may be stored at a lower pressure if the downstream equipment D can be operated at such lower pressures. As described in greater detail in conjunction with FIG. 2, a pressure sensing switch means 48 selectively actuates and deactuates the second compressor means 40 in order to maintain a preselected storage pressure in the storage tank 46. A check valve 50 assures that the primary product gas is received by the storage tank 46 but not discharged therefrom through the compressor start up valving means 42. An on-off primary product control switch 52 selectively enables and disables primary product gas to flow from the storage tank 46 to a primary product outlet 54. A check valve 56 assures that propane, acetylene, or other welding gases are not allowed to enter the primary product storage tank 46.

The flow and pressure control means E prevents the second compressor means 40 from drawing a vacuum on the first and second sieve beds. The second vacuum pump maintains relatively low, positive pressure at the primary product output end of the sieve beds. In the preferred embodiment, the pressure at the primary product output end of the beds is several pounds lower than the pressure supplied to the inlet end. This pressure differential reduces the amount of work required of the first compressor to move or pump the gas through the molecular sieve beds. Thus, the present invention permits the first compressor to have a lower horsepower because the sieve beds operate at a lower pressure.

The flow and pressure regulating means E include a fourth restrictor 60 to reduce the output pressure of the sieve bed assembly B still further. The fourth restrictor smooths the primary product flow rate and pressure from the sieve bed assembly sufficiently that no surge tank is required. In the preferred embodiment, the fourth restrictor means 60 in conjunction with the first, second and third restrictor means reduces the output primary product pressure to about zero psi. A flow control valve means, such as a needle valve 62, throttles back the flow of primary product therethrough such that the primary product pressure is maintained at 2 to 6 psi upstream thereof during operation of the second compressor. In the preferred embodiment, the needle valve is adjusted such that the flow rate therethrough matches an optimum primary product output flow rate for the sieve bed assembly. That is, at different flow rates, the sieve bed assembly produces oxygen of different purities. The flow rate through the needle valve is adjusted to select the best available flow rate for the selected purity. Increasing the flow rate permitted by the needle valve tends to provide a greater volume of primary product gas but with a lower oxygen concentration; decreasing the flow rate through the needle valve tends to provide a smaller volume of primary product gas but with a higher concentration of oxygen.

Figure 2:
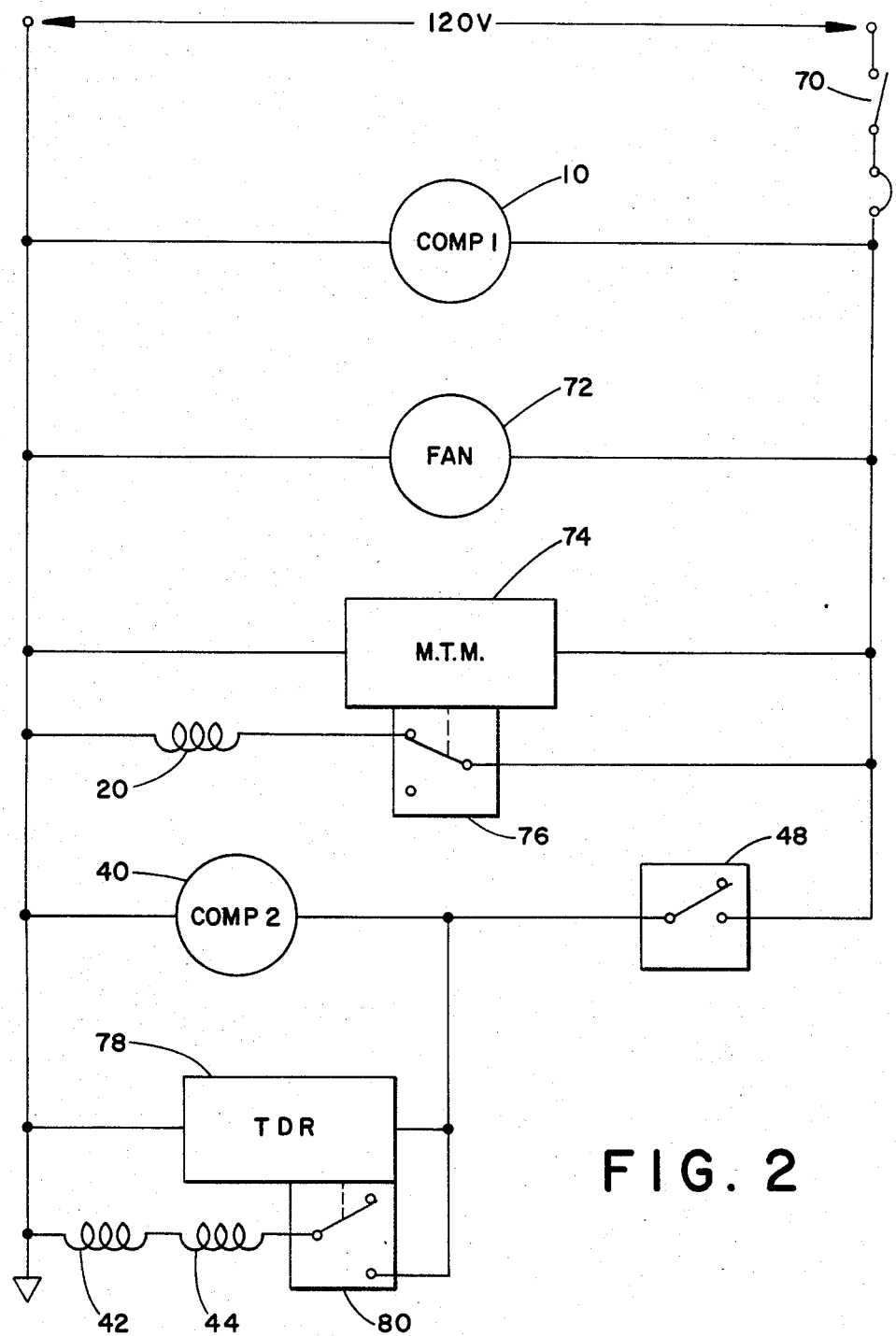

With reference to FIG. 2, the control circuit F includes an on-off switch 70 connected with the non-grounded side of a 120 volt or 240 volt power supply. The first compressor 10 is connected in series with the on-off switch and power supply such that it runs continuously whenever the unit is actuated by the on-off switch 70. A cooling fan motor 72 is likewise connected in parallel with the first compressor such that it too runs continuously whenever the unit is on. A mechanical timer motor 74 is connected in parallel with the first compressor means for cyclically opening and closing a time controlled switch 76. The time controlled switch 76 is connected in series with the crossover valve 20 for cyclically moving the crossover valve between its first and second positions with a regular periodicity. The second compressor 40 is connected in series with the pressure sensing switch means 48 such that the second compressor 40 is actuated and responds to the pressure sensing switch sensing a pressure below the preselected storage pressure, e.g., below 65 psi. A time delay relay 78 is connected in parallel with the second compressor and in series with the pressure sensing switch for closing a relay means 80 a preselected duration after the pressure sensing switch is actuated, e.g., five seconds. The relay means 80 is connected in series with the compressor start up valves 42 and 44. In this manner, the compressor start up valves 42 and 44 move from a non-actuated position in which the second compressor operated under no load to the actuated position illustrated in FIG. 1 in which the second compressor draws the primary product from the pressure and flow regulator means E and pumps it to the storage tank 46.

The invention has been described with particular reference to the preferred embodiment. Various alterations and modifications will become apparent upon reading and understanding the preceding detailed description of the preferred embodiment. It is intended that the invention be construed as including all such alterations and modifications insofar as they come within the scope of the appended claims or the equivalents thereof.

Having thus described a preferred embodiment of the invention, the invention is now claimed to be:

1. A method of separating a primary product gas from a gaseous mixture, the method comprising:
   supplying the gaseous mixture at a first relatively low pressure alternately to first and second molecular sieve beds which each contain a physical separation medium which selectively adsorbs at least one adsorbable component of the mixture and passes the primary product gas and causing the adsorbable component to be removed from the other of the first and second beds;
   drawing the primary product gas from adjacent the molecular sieve beds to increase a pressure drop thereacross such that the primary product gas has a second relatively low pressure adjacent the molecular sieve beds;
   limiting the second relatively low pressure to positive pressures;
   selectively adjusting a rate at which primary product gas is drawn from the molecular sieve beds to adjust the purity thereof;
   increasing the pressure of the primary product gas from the second relatively low pressure to a relatively high pressure;
   storing the increased pressure primary product gas in a storage tank; and,
   maintaining the storage tank generally at the relatively high pressure.

2. The method as set forth in claim 1 wherein the second relatively low pressure is about 2–6 psi and the relatively high pressure is at least 45 psi.

3. The method as set forth in claim 2 wherein the first relatively low pressure is about 15–18 psi.

4. The method as set forth in claim 1 further including regulating the flow rate and pressure of the primary product gas from the molecular sieve bed before the primary product gas is increased in pressure to the relatively high pressure.

5. The method as set forth in claim 1 further including the step of monitoring the storage pressure in the storage tank and selectively controlling the pressure increasing step to maintain the storage pressure in the storage tank substantially constant.

6. A method of separating oxygen from atmospheric air, the method comprising:
   supplying the air at a first relatively low pressure alternately to one of first and second molecular sieve beds which contain a physical separation medium that selectively adsorbs nitrogen and other components of air and passes through oxygen, while causing the nitrogen and other adsorbable components to be removed from the other of the first and second beds, oxygen rich gas being discharged from an oxygen outlet of the molecular sieve beds;
   selectively drawing air through a compressor as the compressor is started;
   after the compressor is started, drawing the oxygen rich gas from the molecular sieve bed oxygen outlet through the compressor to reduce the pressure at the molecular sieve bed oxygen outlet and to increase oxygen rich gas pressure to a relatively high pressure.

7. The method as set forth in claim 6 wherein the relatively high pressure oxygen rich gas is supplied to a storage tank and further including selectively starting and stopping a second compressor to maintain the oxygen rich gas in the storage tank generally at the relatively high pressure.

8. An apparatus for supplying a primary product gas at a relatively high pressure, the apparatus comprising:
   a first compressor means for providing a gaseous mixture at a first relatively low pressure;
   a valving means for alternately channelling the gaseous mixture from the first compressor means alternately to a first end of each of at least two molecular sieve beds for separating the primary product gas from the gaseous mixture;
   a second compressor means which receives the primary product gas from a second end of the molecular sieve beds for maintaining pressure adjacent the second end of the molecular sieve beds at a second relatively low pressure which is less than the first relatively low pressure and for supplying the primary product gas to a primary product outlet at a relatively high pressure which relatively high pressure is greater than both the first and second relatively low pressures; and,
   a second compressor start-up valve means for selectively (a) enabling the second compressor to be operated without load for a start-up duration and (b) after the start-up duration, channelling the primary product gas from the sieve beds through the second compressor means to downstream equipment, the start-up valve means being operatively connected with the sieve beds second end and the second compressor means, whereby the second compressor means is able to be started without load.

9. The apparatus as set forth in claim 8 further including a flow and pressure regulating means disposed between the molecular sieve bed second ends and the second compressor means for regulating the flow rate of the primary product gas to the second compressor means and for regulating the amount that the second compressor means draws down the second relatively low pressure.

10. The apparatus as set forth in claim 9 wherein the pressure and flow regulating means includes a pressure and flow regulator restrictor means for restricting the flow of the primary product therethrough and causing a pressure drop thereacross and an adjustable valve means for selectively adjusting the flow of the primary product gas therethrough and adjusting the primary product pressure upstream thereof.

11. The apparatus as set forth in claim 10 further including a pair of restrictor means connected in parallel with each other and each connected in series between the pressure and flow regulator restrictor means and the second end of one of the molecular sieve beds.

12. The apparatus as set forth in claim 9 further including welding equipment connected downstream from the second compressor means.

13. An apparatus for supplying oxygen rich gas at a relatively high pressure to downstream welding equipment and the like, the apparatus comprising:
   at least two molecular sieve beds for separating an oxygen rich gas from a gaseous mixture, the molecular sieve beds having air inlets at a first end thereof and oxygen outlets at a second end thereof;
   a first compressor means for providing air at a first, positive pressure;
   a valving means for alternately channelling the air from the first compressor means to one of the sieve bed air inlets and for connecting another of the molecular sieve bed air inlets with a waste gas outlet;
   a second compressor means operatively connected with the molecular sieve bed oxygen outlets for drawing the oxygen rich gas to a second, relatively low pressure which is less than the first positive pressure;
   a flow and pressure regulating means operatively between the molecular sieve bed oxygen outlets and the second compressor means for selectively regulating the flow rate and pressure of oxygen rich gas flowing from the molecular sieve bed oxygen outlets such that the second pressure is maintained positive, whereby the flow and pressure regulating means and the second compressor means interact to bring the pressure at the molecular sieve bed second ends to a low but positive second pressure; and,
   an oxygen storage tank operatively connected downstream from the second compressor means to receive compressed oxygen rich gas therefrom at a third pressure, which third pressure is greater than both the first and second pressures, the oxygen supply tank being adapted for interconnection with the downstream welding equipment.

14. The apparatus as set forth in claim 13 wherein the flow and pressure regulating means includes an adjustable flow control means for selectively (a) increasing the rate of oxygen rich gas flow through the flow and pressure regulating means while decreasing a concentration of oxygen therein and (b) decreasing the oxygen rich gas flow rate while increasing the concentration of oxygen therein, whereby the flow rate and purity of oxygen to the oxygen reservoir is selectively adjustable.

15. The apparatus as set forth in claim 13 wherein the first pressure is less than 45 psi, the second pressure is about 2-6 psi and the third pressure is at least 45 psi.

16. The apparatus as set forth in claim 13 further including a start up valve means associated with the second compressor means for enabling the second compressor to be actuated without load.

17. The apparatus as set forth in claim 13 further including a pressure sensitive control means for controlling the second compressor means in response to the pressure in the storage tank such that a generally constant pressure is maintained therein.

18. The apparatus as set forth in claim 17 further including second compressor start up valve means operatively connected with the pressure sensing means for enabling the second compressor means to be actuated without load for a preselected duration and after the preselected duration for connecting the second compressor means in series between the pressure and flow regulating means and the storage tank.

19. The apparatus as set forth in claim 18 wherein the first compressor means is interconnected with a power supply such that the first compressor means runs continuously while the pressure sensing means switches the second compressor means on and off.

20. An apparatus for supplying an oxygen rich gas at a relatively high pressure to downstream welding equipment, the apparatus comprising:
- a first compressor means for providing air at a first pressure;
- a valving means for alternately channelling the air from the first compressor means alternately to a first end of each of at least two molecular sieve beds for separating oxygen rich gas from the air;
- a second compressor means which receives the oxygen rich gas from a second end of the molecular sieve beds and supplies the oxygen rich gas to a storage tank at a selected, relatively high pressure;
- pressure sensing means for sensing oxygen rich gas pressure in the storage tank; and,
- a control operatively connected to the first compressor means, the second compressor means, and the pressure sensing means, the control causing (1) the first compressor means to run substantially continuously and (2) the second compressor means to run intermittently, as necessary to maintain said selected relatively high pressure in the storage tank.

* * * * *